United States Patent [19]
Schultz

[11] 3,966,981

[45] June 29, 1976

[54] PROCESS FOR REMOVING RESIDUAL SOLVENTS

[75] Inventor: William G. Schultz, El Cerrito, Calif.

[73] Assignee: The United States of America as represented by the Secretary of Agriculture, Washington, D.C.

[22] Filed: Nov. 26, 1974

[21] Appl. No.: 527,402

[52] U.S. Cl. .............................. 426/425; 134/25 R; 134/42; 426/430
[51] Int. Cl.² ........................................ B01D 11/02
[58] Field of Search ........... 426/425, 429, 430, 478, 426/489; 260/412.4, 417; 134/25 R, 40, 42

[56] References Cited
UNITED STATES PATENTS

| | | | |
|---|---|---|---|
| 3,252,807 | 5/1966 | Kuramoto | 426/430 |
| 3,477,856 | 11/1969 | Schultz | 426/424 |

FOREIGN PATENTS OR APPLICATIONS

| | | | |
|---|---|---|---|
| 1,057,911 | 2/1967 | United Kingdom | 426/430 |
| 1,106,468 | 3/1968 | United Kingdom | 426/430 |

OTHER PUBLICATIONS

Abstract, "Solubility of $CO_2$ and $H_2S$ in Liquid Hydrocarbons at Cryogenic Temperatures," 70:413125, 1968.

Abstract, "Low Temperature Absorption of $CO_2$ by Acetone," 68:99188f, 1967.

"Bland Undenatured Soybean Flakes . . . ." by Mustakas et al., found in The Journal of the Am. Oil Chemists Society, Sept. 1961. Issue vol. 38, No. 9, pp. 473–478.

"Determination of Residual Solvent in Oilseed Meals and flours . . . ." found in The Journal of the Am. Oil Chemists Society, vol. 47, No. 1, pp. 17–18.

*Primary Examiner*—Frank W. Lutter
*Assistant Examiner*—N. Greenblum
*Attorney, Agent, or Firm*—M. Howard Silverstein; David G. McConnell; William Takacs

[57] ABSTRACT

Process for removing residual solvent from materials containing the same which involves extracting the material with liquid $CO_2$, separating the phases, and evaporating $CO_2$ from the treated material. For example, residual hexane can be removed from de-fatted soybeans by this procedure.

1 Claim, No Drawings

PROCESS FOR REMOVING RESIDUAL SOLVENTS

DESCRIPTION OF THE INVENTION

The invention relates to and has among its objects the provision of novel processes for removing solvent from materials containing the same. Further objects of the invention will be evident from the following description wherein parts and percentages are by weight unless otherwise specified. The abbreviation "ppm" used herein means part per million.

Many argicultural products contain oil in addition to protein and/or carbohydrate components, and it is desirable to separate the oil prior to processing the other components. For example, soybeans are an excellent source of protein and they also have a high oil content. To prepare soybean products for food and feed use, it is common to extract the oil with hexane or similar organic solvent. Although hexane is a highly volatile liquid, it is found that the de-fatted material still contains residual hexane even after application of air drying or similar evaporative procedures. Similar problems are also encountered with de-fatted products from peanuts, cottonseed, flaxseed, cereal bran, copra, fish meal, and the like. Since hexane is a material foreign to soybeans and other agricultural products, its presence therein is obviously undesirable. According to current FDA regulations the maximum allowed concentration of hexane in cottonseed meal for human use is 60 ppm. With the present concern about the wholesomeness of our foods, even 60 ppm may be too high a limit and thus subject to reduction in the near future.

Several methods are presently known and used in industry for reducing the residual content of hexane. For example, de-fatted soybeans may be treated with vacuum or steam or toasted in an oven to promote evaporation of residual solvent. It has been observed, however, that even intensive application of such treatments will yield products containing at least 60 ppm of hexane. Moreover, the application of prolonged heating has the disadvantage of denaturing the protein in the product so that the dispersibility thereof is reduced. Also, such heat treatments tend to promote the development of undesirable flavors and dark colors in the products.

The invention described herein provides a means for obviating the problems outlined above. In accordance with the invention, the content of residual organic solvent is reduced by extracting the product with liquid $CO_2$, which has the unique ability of dissolving the residual solvent while not dissolving the desired components of the product such as proteins and carbohydrates.

A primary advantage of the invention is that the content of residual organic solvent may be reduced to very low levels, for example, 1–10 ppm or less. This is in contrast to presently employed methods which are capable of removing residual solvent only to about 60 ppm.

Another advantage of the invention is that it does not denature the protein present in the product under treatment. Thus, for example, application of the invention to de-fatted soybeans yields a wholesome, tasty product of high nutritive value. A major factor which contributes to the above advantage is that in the process of the invention the material under treatment need not be subjected to elevated temperature.

Another advantage of the invention is that the residual organic solvent extracted by liquid $CO_2$ can be recovered from the extract phase. This feature has obvious economical and environmental consequences.

A further advantage of the invention is that liquid $CO_2$ is non-inflammable and non-explosive. This simplifies the extraction and evaporation steps since there is no hazard of fire or explosion.

Another advantage is that liquid $CO_2$ is odorless so that it does not interfere with or detract from the flavor of the material under treatment. Also, $CO_2$ is non-toxic and natural component of foods so that its use with food products is safe.

A further advantage to be mentioned is that liquid $CO_2$ is inert; that is, it does not react with the material under treatment. Moreover, liquid $CO_2$ is stable—it does not hydrolyze or otherwise decompose so that there is no contamination of the product under treatment nor of recovered organic solvent.

Another item is that liquid $CO_2$ has a low viscosity: one-fifteenth that of water. As a result, it can penetrate very readily into the material to be extracted whereby to yield rapid and effective results.

A further point to be mentioned is that liquid $CO_2$ does not emulsify with the material being extracted so that separation of the extract phase is accomplished readily and efficiently. Also, separation of the components of the extract phase is accomplished easily because of the wide difference in volatility between liquid $CO_2$ and hexane or similar organic solvents.

Another advantage of the invention is that liquid $CO_2$ will not only remove residual organic solvent from the material under treatment, but also will remove detrimental substances of low molecular weight (i.e., containing 1 to 6 carbon atoms) such as methanol and aldehydes such as hexanal which may be present in small amounts either naturally, or as a result of some processing technique, or as a result of chemical reactions which take place on aging (storage). In any event, their removal is most often desirable because some of these compounds are toxic (e.g., methanol) or contribute to off-flavor (e.g., hexanal). With regard to the latter, it is well-known that lipid-containing products—even those with only small amounts of fats, such as de-fatted soybeans—when stored undergo oxidative and enzymatic reactions which produce aldehydes such as hexanal that contribute to rancid flavor.

In this description emphasis is directed to the removal of residual hexane from de-fatted soybeans. This direction is solely for purposes of illustration and not limitation. The process of the invention may be applied to all kinds of materials that contain a residue of organic solvents having 1 to 6 carbon atoms. Examples of such materials include cereal grains; cereal bran; cereal germ; fish meal; oilseeds such as soybeans, cottonseed, sesame seed, flaxseed, peanuts, copra, and the like. The residual solvent which is removed from the material by the process of the invention includes hydrocarbons such as propane, butane, pentane, and hexane; alcohols such as methanol, ethanol, propanol, isopropanol, butanol, pentanol, and hexanol; ketones such as acetone and methyl ethyl ketone; ethers such as diethyl ether; ether-alcohols such as ethylene glycol monomethyl and monoethyl ether; halogenated hydrocarbons such as chloroform, ethylene dichloride, perchloroethylene, and the like.

In a typical practice of the invention the material to be treated—preferably in particulate form such as granules, flakes, or meal—is contacted with an excess of liquid $CO_2$. Preferably, the contact is accomplished by mixing the material with the liquid $CO_2$, and then allowing the mixture to settle. The liquid $CO_2$ phase containing organic solvent dissolved out of the material is separated by decanting, filtration, screening, or centrifugation. It is, or course, obvious that the steps of mixing with fresh liquid $CO_2$ and separation of the liquid and solid phases may be repeated as often as necessary to reduce the content of organic solvent in the material to the desired level. In an alternative embodiment of the invention, the material to be extracted is placed in a vessel, and liquid $CO_2$ is percolated through the material. For best results one would provide a series of beds of the material and contact these beds with liquid $CO_2$ in countercurrent fashion.

The conditions of the extraction—such as proportion of materials, temperature, pressure, etc.—are not critical and may be varied to suit individual circumstances. The amount of liquid $CO_2$ is not a critical factor; generally one uses about 1 to 20 parts thereof per part of material to be extracted. To maintain the $CO_2$ as a liquid, the system is kept under superatmospheric pressure. Generally, pressures of about 65–75 atm. are adequate and preferred. Usually for convenience the extraction is conducted at about room temperature. This, however, is not a critical item and one may use lower or higher temperatures. For example, low temperatures on the order of 0° to − 10° C. can be used and may even be preferred in special cases where it is desired to inhibit enzyme and/or microbiological action. In the alternative, the extraction may be conducted at temperatures above room temperature. Usually, it is preferred that the extraction be carried out below the critical temperature (31° C.) of $CO_2$. However, it is within the broad purview of the invention to use temperatures above this level where the $CO_2$ exists as a supercritical fluid. In any event, it is obvious that the temperature should not be so high as to denature the protein in the material to be extracted. It is also obvious that as the operating temperature is altered a corresponding change in pressure may be required to maintain the $CO_2$ in the liquid phase. This is, however, no problem as the minimum pressure required to maintain $CO_2$ in a liquid state at a given temperature can be ascertained from standard tables of physical properties of $CO_2$.

Following separation of the liquid $CO_2$ extract phase from the extracted material, the latter is treated to remove residual $CO_2$. Since $CO_2$ is normally a gas, its removal from the extracted material is accomplished very readily by allowing the material to stand exposed to the atmosphere. If desired, evaporation of liquid $CO_2$ may be expedited by applying heat (e.g., about 30°–50° C.) to the extracted material. In the alternative, one can use a system wherein a subatmospheric pressure is applied to the material in order to effect removal of $CO_2$. In all these cases, the $CO_2$ can be collected and reconverted to the liquid state for re-use.

The liquid $CO_2$ phase containing dissolved organic solvent derived from the treated material can be treated to recover the organic solvent. This may be accomplished by simply allowing the extract phase to stand, whereby the liquid $CO_2$ will evaporate, leaving the organic solvent. To expedite the evaporation heat and/or reduced pressure may be applied. Simple evaporative techniques such as those outlined above will result in some loss of organic solvent by vaporization of a portion thereof with the evaporating liquid $CO_2$. To prevent such losses, one can use such unit processes as absorption, fractional distillation, selective condensation, or the like, in separating the $CO_2$ from the organic solvent.

EXAMPLES

The invention is further demonstrated by the following illustrative examples.

Example 1

A. The starting material was de-fatted soybean flakes having a residual hexane content of 228 ppm. The flakes (450 g.) were soaked in 4,250 ml. of liquid $CO_2$ for 72 hours at 22° C. and 65–75 atm. The extracted flakes were then separated from the liquid $CO_2$ and air dried. The residual hexane content in the extracted flakes was found to be 44 ppm, a reduction of 81%.

B. The extracted flakes from part A were extracted two times with fresh liquid $CO_2$, using the conditions described in part A. The hexane content of the flakes was thus reduced to 3.6 ppm., and then to 0.7 ppm.

Example 2

The starting material was soybean flakes which had been de-fatted by extraction with n-hexane-ethanol azeotrope 82:18 v/v. The flakes were extracted with liquid $CO_2$ as described in Ex. 1, part A. Analysis of the starting material and the extracted product yielded the following data:

| Compound | Amount of compound, ppm. | |
|---|---|---|
| | Before ext. with liquid $CO_2$ | After ext. with liquid $CO_2$ |
| Methanol | 12.8 | 3.4 |
| Ethanol | 1590.0 | 325.0 |
| Hexane | 1005.0 | 290.0 |
| Hexanal | 5.2 | 3.7 |

Having described the invention, what is claimed is:
1. A process for removing residual hexane from soybeans which have been de-fatted by extraction with hexane, which process comprises:
   a. extracting the de-fatted soybeans with liquid $CO_2$ at a pressure and temperature at which the $CO_2$ remains in the liquid state,
   b. separating the extracted de-fatted soybeans from the liquid $CO_2$ extract, and
   c. evaporating $CO_2$ from the extracted de-fatted soybeans.

* * * * *